Figure 1:
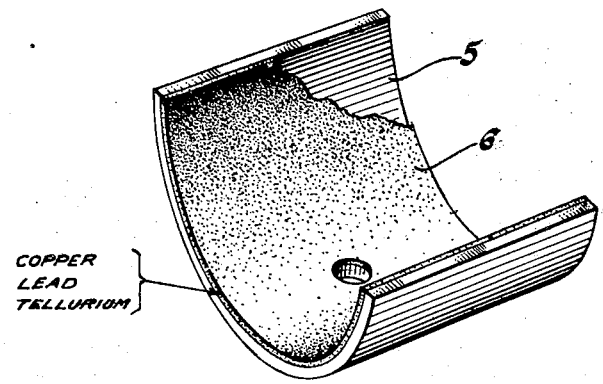

March 10, 1936.    A. L. BOEGEHOLD    2,033,321
BEARING METAL ALLOY AND BEARING MADE THEREFROM
Filed Oct. 19, 1933

Inventor
Alfred L. Boegehold

By Blackmore, Spencer & Flint
Attorneys

Patented Mar. 10, 1936

2,033,321

UNITED STATES PATENT OFFICE 2,033,321

BEARING METAL ALLOY AND BEARING MADE THEREFROM

Alfred L. Boegehold, Detroit, Mich., assignor, by mesne assignments, to General Motors Corporation, Detroit, Mich., a corporation of Delaware Application October 19, 1933, Serial No. 694,251

3 Claims. (Cl. 308—237)

My invention relates to bearings designed especially for use as crank shaft and crank pin bearings of internal combustion engines wherein the speed or rotation is or may be around 3500 to 4500 rotations per minute, and wherein the pressure or load upon the bearings is unusually high and the conditions of operation otherwise severe and exacting; and the object thereof is to provide a bearing wherein the bearing surface will not be roughened, abraided or otherwise injured when the bearing is in use; such injury to the bearing being commonly referred to as "galling" and which, when it occurs to any material degree, commonly results in excessive heating of the bearing and in injury to the crank pin or shaft journals as by grooving or scoring the same, and in seizing between the surfaces which run in contact with one another.

I have found by extensive experimentation that the bearing qualities of copper-lead bearing mixtures or alloys are greatly improved by adding a small amount of tellurium to the mixture or alloy; and my invention therefore consists in a bearing metal the principal ingredients of which are copper and lead, and to which a small amount of tellurium is added.

Copper-lead mixtures for bearing purposes ordinarily contain from 70% copper and 30% lead, to 50% copper and 50% lead. The composition of such mixtures (which are commonly called "plastic bronzes") varies considerably although the range above indicated includes those in most common use; and they may contain up to around 5% of tin, and sometimes small amounts of nickel, silver, or other metals, without materially changing the bearing qualities of the copper-lead mixture upon which the characteristics of the bearing depends. The addition of tellurium, as I have found, greatly improves such plastic bronze bearing metals irrespective of whether they contain small amounts of metals other than copper and lead, or whether they are composed wholly of copper and lead and contain no other ingredients.

I have experimented with a large number of plastic bronze bearing materials or alloys within the copper-lead range above mentioned, both without tellurium and having a small quantity of tellurium in the mixture, and have found that in every case the bearing is materially improved by the use of tellurium as an ingredient of the bearing metal. Such improvement consists in that galling, scoring, scratching or other injury to the crank pin and crank shaft journals is entirely eliminated, and in that heating of the parts is very much reduced when a small amount of tellurium is added to any particular copper-lead bearing alloy; and in that such bearings (containing tellurium) and the journals with which they cooperate acquire a high and permanent polish after a short period of use. Bearings made in accordance with my invention while they resist the pounding action to which they are subjected when in use appear to be more plastic, and to conform better to the journals with which they cooperate, than bearings of the same copper-lead composition but in which tellurium is not present.

The amount of tellurium may vary throughout a considerable range. I have found that the addition of 1% of tellurium to mixtures within the copper-lead range above mentioned results in a decided improvement in the bearing qualities of the bearing produced therefrom, although better results are secured if the amount of tellurium is as much as 2% of the total copper-lead content; and I have experimented with amounts of tellurium up to 7%. Increasing the amount of tellurium in the bearing metal composition results, generally speaking, in better bearings, although it will seldom be necessary to increase the quantity thereof up to more than 3 or 4% of the total mixture; and I have found during my experiments that the advantageous results herein enumerated will be secured by the use of that percentage of tellurium throughout the entire copper-lead range hereinbefore mentioned; that is throughout a range of from 70 copper 30 lead, to 50 copper 50 lead.

My invention relates particularly to bearings of the type wherein a bearing metal facing is fused onto a mild steel supporting shell or backing so as to be integral therewith to all intents and purposes; the steel back being first heated to a temperature approximately that required for melting the bearing metal, the molten bearing metal being then poured into contact with the steel back, and the two being then suddenly cooled to a temperature below that at which the molten bearing metal becomes solid and afterward machined to form finished bearings as will be appreciated. Such bearings may be made in accordance with the process disclosed in the application of Norman H. Gilman, filed May 6, 1929, Serial Number 360,899; or with the process disclosed in the application of Alfred L. Boegehold, Alfred W. Schluchter and Robin H. Terry, filed May 12, 1933, Serial Number 670,658.

In the drawing:

Figure 1 illustrates a finished bearing made in accordance with my invention, and of the type last above mentioned. Therein the reference numeral 5 designates a mild steel support or back, and 6 a facing fused to and integral with the back; the facing being cast from a bearing metal alloy composed of copper, lead and tellurium in the proportions hereinbefore disclosed, and in the manner referred to. In bearings of the dimensions used in automobile engines the steel back is ordinarily on the order of $\frac{1}{16}$ of an inch or less in thickness, and the bearing metal facing on the order of 1/32 of an inch or less in thickness. My invention is based upon observations made during extensive experimentation with bearings made from bearing metals or alloys composed of copper, lead and tellurium combined in various proportions within the range hereinbefore mentioned, rather than upon any theory as to why a bearing made in the way disclosed, and having a facing of such a bearing metal composition or alloy, is superior to other bearings. My understanding, however, is that in this preferred form of bearing molecules of the molten copper intermingle with those of the highly heated ferrous metal shell thus forming a fused bond between the bearing metal lining and the shell or casing, and that the sudden cooling before the lead and tellurium have time to segregate from the copper entraps and holds them in a matrix of copper which in turn is bonded to the iron or steel shell by a fused union therewith along the contacting surface between the two.

Figure 2:
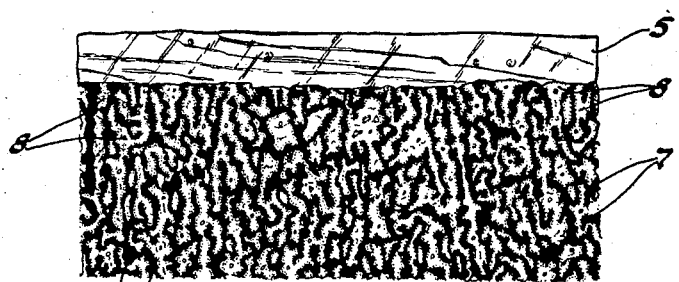

During my investigations and upon magnifying sections of bearings I have observed that in bearings made from alloys of copper and lead (but no tellurium) the lead particles are embedded in matrices of copper, and are isolated from one another thereby; whereas when more than 1% of tellurium is present in the mixture from which the bearings are formed the sections appear as illustrated in Figure 2 the lead 7, which appears darker than the copper 8, forming a continuous network throughout the section; which molecular structure I have found only in copper-lead-tellurium alloys and which I believe to be due to the presence of tellurium therein. However and without asserting that the improved results which I have found to follow from the use of tellurium are due to such a network and molecular structure, nor that they may not be due to something else, I have observed such distinguishing features in bearings made in accordance with my invention, and believe the network formation to be due to the presence of tellurium, and the improved results secured to be due to the difference in molecular structure observed to follow from the use of tellurium in the plastic bronze bearing metal.

I have also investigated copper-lead mixtures to which small quantities of selenium have been added and find that a better bearing alloy, and a better bearing, is secured by its use, the results in the case of any particular copper-lead composition being substantially the same in character and in degree when selenium is used as when tellurium is used; and I therefore regard my invention as including selenium as an equivalent of tellurium in a bearing metal alloy and bearing made therefrom in accordance with my invention. The two have similar properties, and are closely related, chemically, and I have found that they produce like results when added to copper-lead bearing alloys and that both improve the bearing forming qualities thereof as hereinbefore explained. Selenium, however, is more volatile than tellurium when molten and is more difficult and troublesome to work with, so that tellurium is the ingredient which I prefer to use in the practice of my invention; although on the other hand I have found that lesser amounts of selenium, approximately half as much, need be used to produce the same or approximately the same improvement in copper-lead bearing alloys as is produced by tellurium therein.

The copper-lead-tellurium alloy may be readily produced by placing the requisite quantities of copper and lead in a crucible and melting them together, the temperature required for proper fusion of the two being around 1800° F.; after which tellurium sufficient to provide the quantity thereof required in the finished alloy is immersed in the molten copper-lead bath; the whole being stirred to secure a uniform distribution of the ingredients throughout the molten mass as will be understood. The alloy thus formed is now ready for casting into contact with a highly heated ferrous metal shell or supporting backing as hereinbefore explained to form a facing fused or welded to such a support, to thereby form a bearing complete and ready for use except for such machining operations as may be necessary to form a finished bearing. In forming a mixture as above outlined there is little or no loss of tellurium by vaporization, or otherwise, and it will ordinarily be unnecessary to add more of that ingredient than is required in the finished product, to compensate for loss thereof during the melting and casting steps.

When selenium is used in lieu of tellurium the requisite quantity thereof may be placed in the bottom of a crucible, the proper amounts of copper and of lead then added, and the three melted together and cast as above explained. Selenium, however, is more volatile than tellurium and it will ordinarily be necessary to start with more than is required in the finished alloy in order to compensate for loss thereof during the melting and pouring steps.

A preferred method, therefore, of adding selenium to the copper-lead mixture (assumed to be molten) is to first form a selenium-lead alloy rich in selenium; and to add a sufficient quantity of this alloy to the molten copper and lead to produce an alloy of the required composition after the same is added to and becomes mixed with the molten copper-lead mixture. In this way the amount of selenium in the finished alloy may be definitely determined, and the loss thereof by vaporization reduced to a minimum.

Having thus described and explained my invention I claim and desire to secure by Letters Patent:

1. A bearing comprising a ferrous metal supporting shell or backing, and a copper-lead bearing metal facing fused to said support so as to be a unitary part thereof; said facing being composed of from 70 to 50 parts of copper and from 30 to 50 parts of lead, and the same containing a small amount but more than 1% of tellurium.

2. A bearing comprising a ferrous metal supporting shell or backing, and a plastic bronze bearing metal facing containing approximately 70 parts of copper and 30 parts of lead, together with from 1 to 3% of tellurium, said facing being fused to said backing so as to form in effect an integral part thereof.

3. A bearing comprising a ferrous metal supporting shell or backing, and a copper-lead bearing metal facing fused to said support so as to be a unitary part thereof; said facing being composed of from 70 to 50 parts of copper and from 30 to 50 parts of lead, and the same containing from 1 to 7% of tellurium.

ALFRED L. BOEGEHOLD.